United States Patent [19]

Müeller et al.

[11] 4,404,867
[45] Sep. 20, 1983

[54] GEAR UNIT

[75] Inventors: Gerhard Müeller, Taufkirchen; Ernst Puritscher, Unterhaching, both of Fed. Rep. of Germany

[73] Assignee: Siemens Aktiengesellschaft, Berlin & Munich, Fed. Rep. of Germany

[21] Appl. No.: 369,885

[22] Filed: Apr. 19, 1982

[30] Foreign Application Priority Data

Apr. 28, 1981 [DE] Fed. Rep. of Germany ....... 3116793

[51] Int. Cl.³ .................... F16H 37/06; F16H 35/06
[52] U.S. Cl. .................. 74/665 GA; 74/397; 474/113
[58] Field of Search ............... 74/665 GA, 396, 397, 74/665 F, 665 G; 474/112, 113, 114, 26

[56] References Cited

U.S. PATENT DOCUMENTS

| | | | |
|---|---|---|---|
| 1,661,592 | 3/1928 | Wright | 474/114 |
| 1,831,165 | 11/1931 | Eastman | 474/114 |
| 2,204,402 | 6/1940 | Cooper | 474/114 |
| 2,694,938 | 7/1953 | Green et al. | 74/665 GA |
| 2,762,663 | 9/1956 | Sloyan | 474/114 |
| 2,984,137 | 5/1961 | Wilson | 74/665 GA |
| 3,086,403 | 10/1960 | Knerr et al. | 474/114 |

FOREIGN PATENT DOCUMENTS

| | | | |
|---|---|---|---|
| 626035 | 8/1961 | Canada | 474/113 |
| 6805377 | 5/1968 | Fed. Rep. of Germany. | |
| 1120139 | 7/1956 | France | 74/665 GA |

*Primary Examiner*—Leslie A. Braun
*Assistant Examiner*—Stephen Andrews
*Attorney, Agent, or Firm*—Hill, Van Santen, Steadman & Simpson

[57] ABSTRACT

A drive transmission gear unit is constructed to make possible adjustments in the relative spacial relationship between the unit gear wheels and a load shaft. The adjustment in the relative relationship between the unit and the load shaft may be carried out without varying the engagement relationships of the rotary elements within the unit. A centering arrangement is provided in the unit whereby the gear housing portion is rotatable about a driven shaft, thus enabling the gear unit to adjust for slack developing in any belt or chain tension means used to transmit rotary motion to a load shaft.

6 Claims, 3 Drawing Figures

GEAR UNIT

BACKGROUND OF THE INVENTION

The invention relates to a transmission gear housing having at least two driven shafts and connected between a motor drive shaft and a load shaft.

In instances where a load shaft, that is a shaft which directly turns a load, is connected to a motor-driven shaft via a gear drive transmission, slippage may develop whereupon it may be necessary to change the relative spacing between motor and load shafts in order to avoid play. It is, however, not always readily possible to change the position of motor or load shafts. Further, in instances where a gear transmission is used employing a number of drive take-off shafts, a relative change of positioning can create an undesirably high amount of play between the gear wheels.

The present invention provides a solution of this problem in that a construction is afforded whereby the coordination of a gear wheel to a drive take-off wheel arranged on a load shaft is variably adjustable without producing changes in the engagement relationships within the gear transmission unit.

SUMMARY OF THE INVENTION

A gear transmission unit for conducting rotary drive power between a motor driven shaft and a load shaft supports at least two driven shafts. The unit comprises a first housing which is rigidly connected with the motor housing and receives therein the drive shaft of the motor. The unit further includes a second portion support plate connected by releasable fastening means to the first housing portion to prevent relative turning of the housing portion about the axis of the motor drive shaft. A first driven shaft is provided in the unit in driving connection with the motor shaft and journalled on bearing means arranged on the support plate. A centering arrangement of the housing and support plate portions of the unit serves to maintain a predetermined alignment of the support plate and the housing, while still permitting relative rotation of the housing to the support plate.

In accordance with one preferred embodiment of the invention, the centering arrangement comprises a recess in the housing into which is tightly received a lug element formed on the support plate. The lug element contains the bearings for rotatably supporting the first driven shaft and is concentric about the first driven shaft.

A second driven shaft is carried by the unit housing portion in driving connection with the motor shaft and having a drive wheel for transmitting rotational power to the load shaft. A suitable tension means, such as an endless belt, serves to connect the second shaft drive wheel with a power wheel formed on the load shaft. In the event that slack or slippage develops in the tension means, it is possible to re-tighten the tension belt by relative rotation of the unit housing portion on the support plate without altering any of the engagement relationships within the transmission gear unit. In this manner, the use of a tension belt stretching device is unnecessary, and the need for adjustment of the shafts in the gear unit is eliminated.

In accordance with the preferred embodiment of the releasable fastening means, there is provided oblong openings formed in the unit housing arranged concentrically about the axis of the motor shaft and screws which pass through the oblong openings for fastening the housing to the support plate.

DESCRIPTION OF THE PREFERRED EMBODIMENTS

Figure 1:
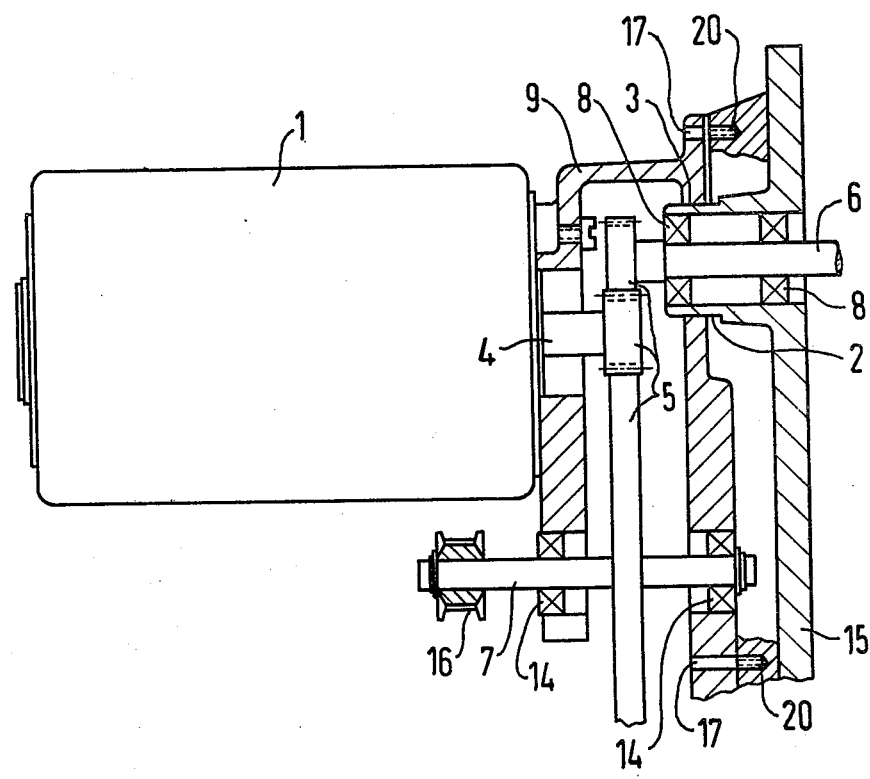
FIG. 1 is a side elevational, cross-sectional view of a rotary motor and transmission gear unit constructed in accordance with the present invention.

FIG. 1 illustrates a drive transmission gear unit having a hollow housing portion 9 which receives therein a drive shaft 4 from a suitable rotary motor 1. The gear unit contains a first driven shaft 6 and a second driven shaft 7, both of which are connected for rotation via gear wheels 5 to the motor shaft 4. The housing portion 9 is screwed together with the motor 1 such that the motor 1 is rigidly mounted to the housing 9.

The first driven shaft 6 is journalled in bearing means 8 disposed outside of the housing 9 on a stationary support plate 15. The second driven shaft 7 is supported for rotation on second bearing means 14 which are carried by opposed side walls of the housing 9. The second driven shaft 7 carries a take-off or power wheel 16 adjacent a free end disposed outside of the housing 9.

The housing 9 is formed with a cylindrical recess 3 for receiving therein in relatively tight fit fashion a cylindrical projecting lug portion 2 formed on the support plate 15. The lug 2 carries the bearing means 8 and is concentrically disposed about the first driven shaft 6. The relatively tight fit of the lug 2 within the cylindrical recess 3 of the housing 9 serves to provide a centering arrangement whereby the housing 9 is aligned with the support plate 15.

Figure 2:
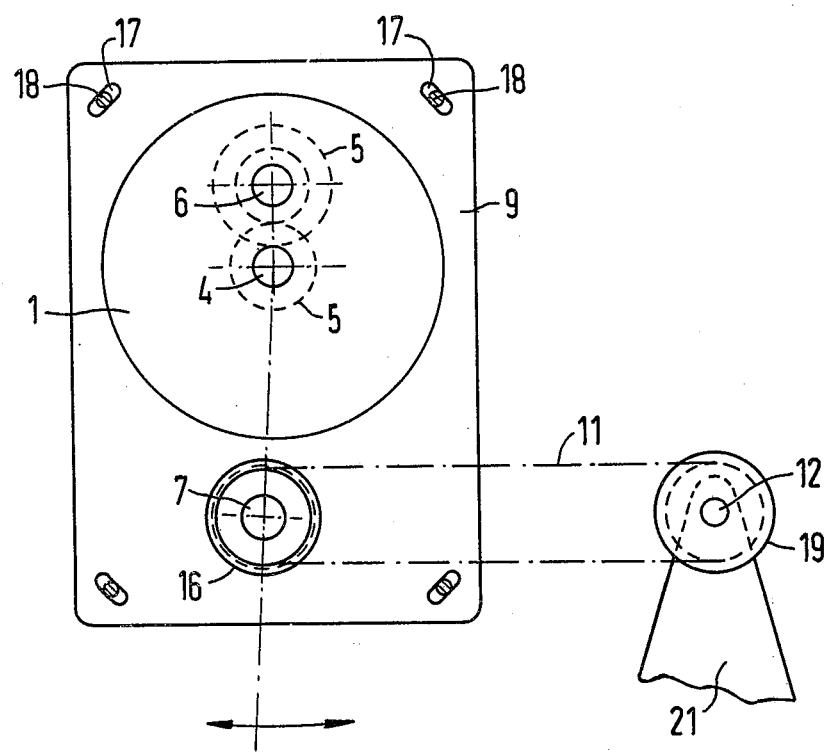
FIG. 2 is a schematic front side view of the assembly of FIG. 1.

As shown in FIG. 2, the housing 9 is formed with a plurality of oblong openings 17 concentrically disposed about the axis of the motor shaft 4. In each case, an oblong opening 17 is arranged over a tap hole element 20 formed on the adjacent facing surface of the support plate 15. Screws 18 are corresponding passed through each oblong opening 17 for fastening into the respective tap holes 20, whereby the housing 9 is connected to the support plate 15.

A rotary load shaft 12 is unalterably arranged on a suitable support body 21. The load shaft serves to drive a rotary load (not shown). A drive or power take-up wheel 19 is disposed on the load shaft 12 and the load shaft rotates about an axis which is parallel to the axis of rotation of the first driven shaft 6. A tension means in the form of an endless chain or belt 11 is threaded about the drive wheel 16 and the power wheel 19 for providing drive transmission therebetween.

In order to adjust the tension of the endless belt 11, such as for the purpose of increasing the friction on the drive transmission wheels 16 and 19 or to permit removal of the belt from the wheels 16 and 19, the seating of the housing 9 on the stationary support plate 15 may be adjusted. Accordingly, the screws 18 are loosened in the tap holes 20 and the housing 9 is able to rotate about the axis of the first driven shaft in the direction of the arrow shown in FIG. 2. As a result of this rotation of the housing 9, the relative dimensional spacing between the take-off wheel 16 and the take-up wheel 19 changes. The engagement relationships of the gears 5 in the gear transmission unit, however, remain unchanged. When the desired change in tension of the belt 11 or the desired special relationship between the wheels 16 and 19 has been attained, the screws 18 are again tightened and the housing 9 is rigidly connected with the support plate 15.

The centering arrangement of the recess 3 and the lug 2 serve to bring about a constant spacing of the drive shaft 4 relative to the first driven shaft 6, despite rotational adjustment of the housing 9 about the axis of the first driven shaft 6. During rotational movement of the housing portion 9 relative to the support plate 15, the drive wheels 5 of the motor shaft 4 and the first driven shaft 6 mesh with one another in movement without change of the engagement relationships by virtue of the free-wheeling nature of the first driven shaft. Coordination between the motor shaft 4 and the second driven shaft 7 does not alter, since both are arranged rigidly on the housing 9.

Figure 3:
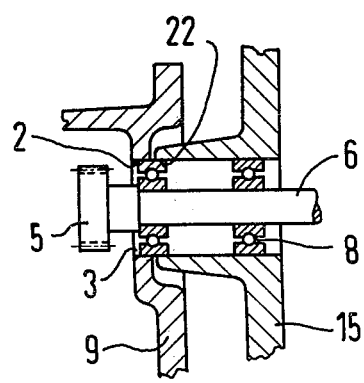
FIG. 3 is a fragmentary side elevational, cross-sectional view of an alternative embodiment centering arrangement constructed in accordance with the present invention.

FIG. 3 illustrates a further embodiment of the centering arrangement. In this case, the lug portion 2 of the support plate 15 is formed as a retaining ring 22 for the first bearing means 8 without a tight-fit insertion into the cylindrical recess 3 of the housing 9. The cylindrical recess 3 is coaxial with the lug portion 2 and also serves to form a retaining ring for one of the bearing means 8. By virtue of this embodiment construction, machine processing of the outer free end of the lug 2 for a tight fit within a cylindrical recess 3 is unnecessary.

While various changes and modifications might be proposed by those skilled in the art, it will be understood that we wish to include within the claims of the patent warranted hereon all such changes and modifications as reasonably come within our contribution to the art.

We claim as our invention:

1. A gear transmission device for connecting to a rotary motor having a drive shaft comprising a housing for receiving therein said drive shaft and first and second driven shafts, said first driven shaft being mounted for rotation on bearing means carried by a stationary support plate, said second driven shaft being mounted for rotation on bearing means carried by said housing, a centering means for maintaining said first driven shaft aligned with said housing, a releasable fastening means connecting said housing for rotation relative to said support plate, and gear wheels drivingly interconnecting said drive shaft with said first and second driven shafts respectively.

2. The gear transmission device of claim 1, wherein said centering means comprises a cylindrical recess formed in said housing and a lug portion formed on said support plate concentric about said first driven shaft for fitting into said recess.

3. The gear transmission device of claim 2, wherein said bearing means for said first driven shaft are carried by said lug portion.

4. The gear transmission device of claim 1, wherein said bearing means for said first driven shaft means has an outer ring and said centering means comprises a lug portion formed on said support plate for supporting said outer ring and a cylindrical recess formed in said housing for concentrically receiving a portion of said first driven shaft bearing means.

5. The gear transmission device of claim 1, wherein said fastening means comprises oblong openings formed on said housing, tap hole portions formed on said support plate for correspondingly aligning with said openings, and screws for passing through said openings into said tap holes.

6. The gear transmission device of claim 1, wherein said second driven shaft is formed with a drive wheel for a belt.

* * * * *